May 23, 1939.  A. BLONDEL  2,159,420
APPARATUS FOR COLOR CINEMATOGRAPHY
Filed June 8, 1935
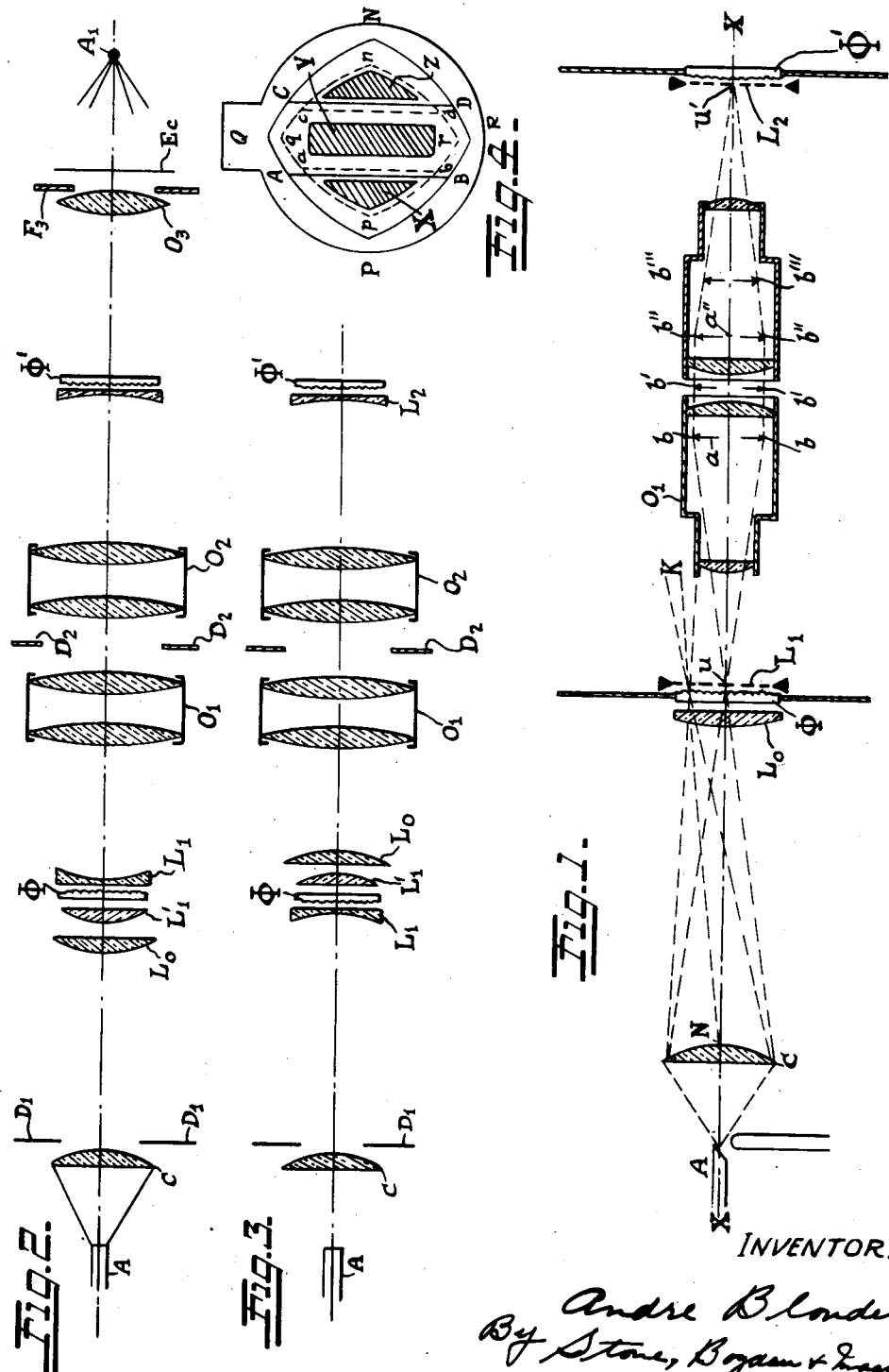
INVENTOR.
Andre Blondel.
By Stone, Boyden & Mack.
Attorney.

Patented May 23, 1939

2,159,420

UNITED STATES PATENT OFFICE 2,159,420

APPARATUS FOR COLOR CINEMATOGRAPHY

André Blondel, Paris, France

Application June 8, 1935, Serial No. 25,655
In France June 11, 1934

5 Claims. (Cl. 88—24)

It is known that films having lenticulations for producing, in connection with suitable filters, color photographs can be copied by projection and projected, but that difficulties arise, particularly due to the occultation of the rays, that is, interception of a part of the rays, proceeding from the lenticular elements of the films in passing through the view-taking, copying and/or projecting optical systems. In projecting the photographs this results in the tints towards the edges, and chiefly towards the corners, of the images being varied.

The present invention has for its object to reduce this occultation of the rays to a minimum and thus to improve the quality of the copy films by using additional optical systems.

According to this invention, the additional optical system comprises thin correcting lenses, preferably cylindrical lenses if the film is provided with cylindrical lenticulations, their cylindrical generatrices being parallel to the cylindrical lenticulations of the film. By these cylindrical lenses the distances of the convergence of the elementary beams emanating from the lenticular elements of the original film or of the copy film can easily be adjusted.

In the present specification, for the sake of simplification, the term "chromogenic" means "adapted to produce coloring in connection with suitable filters", and the term "virtual filter" will be used to denote "the virtual image of a filter produced at a certain distance from the film by the convergence of the rays emanated from the elementary beams of the lenticular elements".

The correcting lenses according to this invention have the function, by modifying the convergence of the elementary beams, of displacing the plane of the virtual filter so as to bring it into the same plane as the real filter or a diaphragm replacing it, allowance being made for the displacement produced by the interposed optical view-taking, projecting or reproducing systems.

According to the present invention, the images obtained on a lenticulated support are projected onto a second lenticulated film intended for copying, by means of the following devices, which may be used separately or in combination, for the purpose of preventing the formation of vicious color dominants.

In copying a lenticular film a light-concentrating optical system is placed on the side of the smooth surface of the original film so that a conjugate image of the centre of the active surface of the illuminating source, for instance, a condenser, mirror or diffuser, is obtained at the centre of the diaphragm of the copying objective. An image of the centre of the above-mentioned active surface is obtained by said optical system at the point of intersection of the axes of the elementary beams emanating from the original.

If, during copying by projection, the point of intersection of the axes of the elementary beams emanating from the original does not lie in the plane of symmetry of the copying optical system nor in the plane which takes the place of said plane when the scale of the copy differs from the scale of the original, an additional correcting optical system is placed near the original film, on its lenticulated side, in order to bring the point of intersection of the axes of the elementary beams into this plane. For compensating a disturbing effect which may result from the use of this additional correcting optical system, there may be arranged on the other side of the original and in its vicinity, a compensating optical system of opposite sign.

To adapt the distance of convergence of the elementary beams of the copy film to the projecting optical system of a theatre, a suitable correcting optical system may be placed in front of the lenticulations of the copy film.

All these optical correcting systems are preferably thin cylindrical lenses when using films having cylindrical lenticulations.

If the distance from the copy film to the copying optical system does not exactly correspond to that suitable for the projecting apparatus which is subsequently employed for projecting the copy film, the optical system of the projecting apparatus is corrected by means of a small correcting lens placed against the lenticulation of the copy film.

The above specified optical means produce in the plane of the main diaphragm, fixed in the copying objective, two images: first, the image of the filter which has been used when recording the original film, and second, the image of the filter which it is intended to use for projecting the copy film in the theatre.

If those two images have different form and sizes, the equilibrium of colors may be disturbed during the copying process. To avoid this disturbance, the diaphragm of the main copying system has, according to this invention, separate openings for every monochrome, these openings corresponding to the common areas of the respective parts of the two above said filter images, as will be fully explained hereinafter.

To make the invention more clearly understood reference is now made, by way of example, to the accompanying diagrammatical drawing in which:

Fig. 1 illustrates the application of the invention to copying by projection.

Figs. 2 and 3 illustrate the use of additional optical means for copying by projection.

Fig. 4 shows the main diaphragm with openings selecting the common parts of the two virtual filter images formed in its plane by the additional lenses.

Fig. 1 illustrates the application of the invention to copying by projection, assuming, by way of example, that the lenticulations of the original film $\Phi$ and of the copy film $\Phi'$ are face to face. $O_1$ and $O_2$ are two optical systems of large aperture and placed very close to each other in order to reduce to a minimum any occultation of the luminous beams by the mountings and diaphragms of the optical systems.

The plane $bb$ is the plane in which the virtual image of the view-taking filter produced by the chromogenic elements of the original film $\Phi$ would lie, without taking into account the optical system $O_1$, if this filter were provided in the arrangement of Fig. 1 at the same position as during taking of the original film. $b'b'$ is the plane of the real corresponding conjugate image produced by the optical system $O_1$, and $b''b''$ is the plane of the virtual image as seen from the copy film $\Phi'$.

The position of $bb$ must be regulated as much as possible so that the plane $b'b'$ is formed between the two optical systems $O_1$, $O_2$ and so that it may be delimited by a suitable diaphragm. On the other hand, the plane of $b''b''$ coincides at the same time with the plane in which there would lie the image of the filter which will have to be placed in the projecting apparatus in which the copy film will be projected.

If the plane $b'b'$ does not come near to the plane of symmetry of the two optical systems $O_1$ and $O_2$, the plane $bb$ has to be displaced by adding a further, very thin, lens $L_1$ near to the original film on its lenticulated side. The lens $L_1$ is convergent or divergent, according to whether it is desired to bring $bb$ closer to or farther away from the original film.

When the lenticulations are cylindrical, it is advantageous to replace the correcting spherical lenses by cylindrical lenses. These lenses do not substantially modify the direction of the rays in the planes parallel to the generatrices of the cylindrical lenticulations.

It is also advantageous to place, in the plane $b'b'$, a diaphragm having a periphery similar to that of the view-taking diaphragm.

If the position of the virtual image of the filter in the projecting apparatus to be employed does not correspond to the distance of the plane $b''b''$ from the plane $b'b'$ furnished by the optical system $O_2$ in the copying device, $b''b''$ will be replaced by another plane $b'''b'''$ by placing against the lenticulated surface of the copy film a small thin lens $L_2$ of suitable focal length, which may be diverging or converging, according to whether it is desired to decrease or increase the distance of the plane $b'''b'''$ from the copy film $\Phi'$. If the film has cylindrical lenticulations, this lens is preferably cylindrical and is provided with generatrices parallel to the cylindrical lenticulations.

The correction of the position of $bb$ may also be previously effected during taking the original film by placing a correcting lens L in front of the original film $\Phi$ during the view-taking. The said lens is divergent or convergent, according to whether it is desired to shorten or lengthen the distance of the plane $bb$ (see Fig. 2) from the original film.

Figs. 2 and 3 illustrate in a more complete manner the arrangement for copying by projection lenticulated films, which arrangement comprises additional optical systems for the purpose of suppressing the disturbance introduced by the correcting lens $L_1$ (see Fig. 1). In Fig. 2, the original film $\Phi$ is placed as in Fig. 1, whereas in Fig. 3, the lenticulations of this film face the light source A.

The concentrating lens $L_0$ produces an image of the diaphragm $D_1$ in the plane of the diaphragm $D_2$ through the original film. The correcting lens $L_1$, placed on the lenticulated side of the original, ascertains the correct place of the plane of intersection of the elementary beams of the original, a second compensating lens $L'_1$ of opposite but otherwise substantially equal curvature to that of the lens $L_1$ is provided, in order to eliminate the disturbing effect of the lens $L_1$ on the concentration of the rays coming from the aperture of the diaphragm acting as a secondary light source, this concentration being effected by the lens $L_0$. If, for instance, $L_1$ is a convergent lens of 0.75 diopter, the lens $L'_1$ will be divergent of minus 0.75 diopter.

Under these conditions, the concentrating lens $L_0$ can remain the same when the correcting lens $L_1$ is modified in order to take into account the different conditions of view-taking of the original. The focal length of the lens $L_0$ can be determined experimentally for example, in order to give the least faint image possible for the diaphragm $D_1$ delimiting the surface of the light projector in the vicinity of the plane $D_2$, in order to obtain the best utilisation of the light beams received through the aperture of $D_1$.

It has been assumed in the foregoing that the virtual image of the view-taking filter which has been used when recording the original film and the virtual image of the projection filter which it is intended to use in projecting the copy film, have the same form, so that when formed respectively in the plane $D_2$, they are equal and coincide exactly, which is not the general case.

Referring to Fig. 4, the contour P, Q, N, R, may correspond for instance to the virtual image of the view-taking filter, enlarged or reduced by the lens $L_1$, and another contour $p$, $q$, $n$, $r$, may respectively correspond to the virtual image of the projecting filter, modified if desired by the lens $L_2$. In this case not only the outlines are different, but the division lines AB and CD of the monochromes of the first image do not coincide with the corresponding division lines $ab$ and $cd$ of the other image, and a disturbance in the reproduction of colors may result therefrom.

According to the invention, this disturbance can be voided by the use, in the plane $D_2$, of an opaque diaphragm shown in Fig. 4, which is provided with separate openings X, Y, Z etc..., according to the number of monochromes. Every opening is as large as possible, but only corresponds to the common part of the respective color areas belonging to the two superimposed filter images, care being taken that the ratios between X, Y, Z correspond to the correct equilibrium of colors.

To facilitate this result, it is recommended that the width of the central part of the view taking filter be reduced, in order to permit the best adjustment of the openings X, Y, Z.

All the means described in the foregoing apply to any method of making copies by projection, and particularly to the method in which two slots or partial apertures are simultaneously displaced in front of the diaphragm D₂ and in front of the source limited, for instance, by a diaphragm D₁, the image of D₂ with respect to the juxtaposed optical system, these slots or apertures being animated by a continuous or discontinuous movement. All the means hereinbefore described also apply to the method according to which the two diaphragms have corresponding apertures, in pairs, which are successively uncovered in pairs.

I claim:

1. Apparatus for copying by projection photographic lenticular films, comprising a support for an original film, a support for a copy film, a source of light for illuminating the original film, a copying objective for projecting the record on the original film onto the copy film, a first relatively weak concentrating lens adjacent the support for the original film adapted to produce in the plane of symmetry of the copying objective an image of the source of light, a second relatively weak correcting lens adjacent the support for the original film for making the axes of the elementary beams emanating from an original film having a zone of natural convergence lying outside said objective intersect in said objective, and a third relatively weak lens of equal and opposite curvature to that of said second lens arranged on the side of the said support for the original film opposite to the said second lens for compensating for the disturbing effect of said second lens on the concentration of the light rays produced by said first lens.

2. Apparatus for copying by projection photographic lenticular films comprising a support for an original film, a support for a copy film, a source of light for illuminating the original film, a copying objective for projecting the record on the original film onto the copy film, a first relatively weak concentrating lens between said source of light and the support for the original film and adjacent the latter adapted to produce in the copying objective an image of the source of light, a second relatively weak correcting lens arranged between the support for the original film and the copying objective for making the axes of the elementary beams emanating from an original film, arranged in said support with its lenticulated side facing the objective and having a zone of natural convergence lying outside said objective, intersect in said objective, and a third relatively weak lens of equal and opposite curvature to that of said second lens, arranged on the opposite side of the support for the original film, for compensating for the disturbing effect of said second lens on the concentration of the light rays produced by said first lens.

3. Apparatus for copying by projection photographic lenticular films comprising a support for an original film, a support for a copy film, a source of light for illuminating the original film, a copying objective for projecting the record on the original film onto the copy film, a first relatively weak concentrating lens between said source of light and the support for the original film and adjacent the latter adapted to produce in the copying objective an image of the source of light, a second relatively weak correcting lens arranged between the source of light and the support for the original film for making the axes of the elementary beams emanating from an original film, arranged in said support with its lenticulated side facing the source of light, intersect in said objective, and a third relatively weak lens of equal and opposite curvature to that of said second lens, arranged on the opposite side of the support for the original film for compensating for the disturbing effect of said second lens on the concentration of the light rays produced by said first lens.

4. Apparatus as claimed in claim 1, wherein there is arranged in front of the support for the copy film a fourth correcting lens for modifying the distance of natural convergence of the copy film.

5. In an optical system for use with lenticular films having a plurality of elementary component images behind each lenticulation, including a source of light, a support for an original film and a principal optical system; an additional optical system comprising at least three relatively weak lenses, two of said lenses being of equal and opposite curvature and being arranged adjacent the support for the original film, one on either side of said support, and the third lens being arranged adjacent the lens on the side of said support facing the source of light, one of said two lenses being adapted to form, in conjunction with an original film arranged in said support, an image of the exit pupil of the objective which has been used in view-taking in the said principal optical system whilst the other of said two lenses compensates for the disturbance of the light rays passing from the source of light to the principal optical system, and another of said additional lenses being a concentrating lens arranged adjacent the lens on the side of the support facing the source of light and being adapted to form an image of the source of light in said objective.

ANDRÉ BLONDEL.